US006057860A

United States Patent [19]
Hoffert et al.

[11] Patent Number: 6,057,860
[45] Date of Patent: May 2, 2000

[54] SYNCHRONOUS SERIAL DISPLAY MONITOR CONTROL AND COMMUNICATIONS BUS INTERFACE

[75] Inventors: Bradley W. Hoffert, Sunnyvale; Shawn F. Storm, Menlo Park, both of Calif.; Abraham E. Rindal, Dunedin, Fla.; Kenneth A. Gross, Los Altos; Robert Stano, Sunnyvale, both of Calif.

[73] Assignee: Sun Microsystems, Inc., Mountain View, Calif.

[21] Appl. No.: 08/632,754

[22] Filed: Apr. 16, 1996

Related U.S. Application Data

[63] Continuation of application No. 08/326,664, Oct. 19, 1994, abandoned.

[51] Int. Cl.$^7$ .................................................. G06F 13/14
[52] U.S. Cl. ............................................. 345/501; 345/10
[58] Field of Search .................................... 345/204, 213, 345/1, 2, 150, 10, 11, 112, 501

[56] References Cited

U.S. PATENT DOCUMENTS

| | | |
|---|---|---|
| 4,298,860 | 11/1981 | Norberg et al. . |
| 4,574,279 | 3/1986 | Roberts . |
| 5,210,530 | 5/1993 | Kammerer et al. . |
| 5,448,697 | 9/1995 | Parks et al. .......................... 345/112 X |
| 5,457,473 | 10/1995 | Arai et al. ................................... 345/10 |
| 5,483,260 | 1/1996 | Parks et al. .......................... 345/213 X |
| 5,550,556 | 8/1996 | Wo et al. ................................. 345/213 |
| 5,565,897 | 10/1996 | Kikinis et al. ........................... 345/213 |
| 5,602,567 | 2/1997 | Kanno .................................... 345/11 X |
| 5,652,845 | 7/1997 | Arai et al. .............................. 345/10 X |
| 5,654,743 | 8/1997 | Ho et al. .............................. 345/112 X |

OTHER PUBLICATIONS

Signetics Linear Data Manual vol. 3 Video, 1987 pp. 3–4, 3–5, 3–8 to 3–26.
Signetics Corporation *Linear Data Manual Volume 3: Video*, Feb. 1987.

*Primary Examiner*—Mark R. Powell
*Assistant Examiner*—Thu Nguyen
*Attorney, Agent, or Firm*—Blakely Sokoloff Taylor & Zafman

[57] ABSTRACT

A monitor interface cable for transmitting display data and command data between a computer system and a display monitor preferably including a microcontroller. The monitor interface cable enables both display and command data to be transmitted simultaneously from the computer system to the display monitor. Inside the computer system, data containing the commands written to a particular memory location in a video buffer card is applied to various signal lines located in the monitor interface cable. These signal lines are coupled to the microcontroller located in the display monitor which receives the commands and performs various controlling functions in response. Status information in the form of a command is transmitted back across a second signal line to the computer system where various software programs including drivers receive and process the status information. Display data is simultaneously transmitted over other signal lines also located in the monitor interface cable.

18 Claims, 6 Drawing Sheets

SYNCHRONOUS SERIAL DISPLAY MONITOR CONTROL AND COMMUNICATIONS BUS INTERFACE

CROSS REFERENCE TO RELATED APPLICATIONS

This is a continuation of a U.S. patent application (Application Ser. No. 08/326,664) filed Oct. 19, 1994, now abandoned.

BACKGROUND OF THE INVENTION

This Application is related to U.S. Patent Application entitled "High Speed Display System Having Cursor Multiplexing Scheme" (Ser. No. 08/326,311) assigned to the same assignee, Sun Microsystems, Inc. of Mountainview, Calif.

FIELD OF THE INVENTION

The described invention relates generally to the field of computer systems. More particularly, this described invention relates to a high speed display system that allows command and display data to be transmitted between the display monitor and a computer system through a single cable.

DESCRIPTION OF ART RELATED TO THE INVENTION

In recent years, integrated circuit microcontrollers have become less expensive, thereby increasing their use in a variety of systems including display monitors used in conjunction with computer systems. A microcontroller, placed in such a display monitor, generally controls various parameters of the display monitor (e.g., power, brightness, screen configuration, etc.) through command data. The command data for controlling the microcontroller is usually generated by software stored external to the display monitor such as within a computer system.

One method for transferring command data to a microcontroller employed within a display monitor includes the use of a control data cable coupling the display monitor and the computer system. The control data cable enables command data to be transmitted under a standard asynchronous serial communication method from the computer system to the display monitor. As a result, various software programs running on the computer system may be used to automatically configure the display monitor through the transmission of certain commands. Thus, unnecessary costs associated with mechanical controls (knobs, switches and the like) may be eliminated.

In conventional computer systems, in addition to the control data cable, a display data cable is coupled between the computer system and the display monitor in order to transfer display data. The display monitor uses the display data to generate an image on a display screen. Utilizing both a control data cable and a display data cable, however, has a number of disadvantages.

One disadvantage is that multiple cables increase the overall cost of the computer system by requiring more connections and additional components. Moreover, it is often necessary to install an extra serial communication card in the computer system so that it may transmit the commands to the display monitor, thereby causing further costs to be incurred.

Another disadvantage is that multiple cables provide difficulties in controlling EMI radiation, contrary to a single cable implementation whereby EMI radiation can be controlled quite easily and inexpensively. In addition, multiple cables complicate the set-up of the computer system and cause unwanted clutter surrounding the computer system. Based on the foregoing and any other disadvantages, it is desirable to have a method and apparatus for interfacing a computer system to a display monitor that transmits both command data and display data through a single monitor interface cable.

BRIEF SUMMARY OF THE INVENTION

A method and apparatus for transmitting display data and command data between a computer system and a display monitor having a microcontroller is described. A monitor interface cable is provided in which both display and command data are transmitted simultaneously from the computer system to the display monitor. Inside the computer system, command data written to a particular memory location within a video buffer card is applied to various signal lines located in the monitor interface cable. These signal lines are coupled to the microcontroller, located in the display monitor, which receives the command data and performs various controlling functions in response. Status information is transmitted back across a second signal line to the computer system where various software programs including drivers receive and process the status information. Display data is simultaneously transmitted with the command data over other signal lines located in the monitor interface cable enabling the display monitor to show various images on a display screen.

BRIEF DESCRIPTION OF THE DRAWINGS

The objects, features and advantages of the present invention will become apparent from the following detailed description of the present invention in which.

DETAILED DESCRIPTION OF THE INVENTION

The present invention describes a monitor interface cable and its associated communications protocol which collectively enable transmission of command and display data to a display monitor through a single cable. Although, numerous specific details of the monitor interface cable and the protocol communications are set forth, it is obvious that these details are not required to practice the invention. In other instances, well known circuits, devices and the like may not be discussed to avoid obscuring the present invention. Moreover, two specific example has been created for the sole purpose of illustrating the protocol of the present invention. These specific examples lend themselves to explaining and distinguishes the present invention, but is in no way a limitation on the scope of the present invention.

In the detailed description, a number of terms are frequently used to describe and represent characteristics of inputs described herein. With respect to signal representations, a term "high" is representative of and interpreted by integrated circuit gates and other electronic logic as a logic level "1" having a voltage normally between 3–5 Volts, inclusive. Similarly the term "low" is representative of and interpreted by integrated circuit gates as a logic level "0" having a voltage normally between 0–2 Volts, inclusive.

Figure 1:
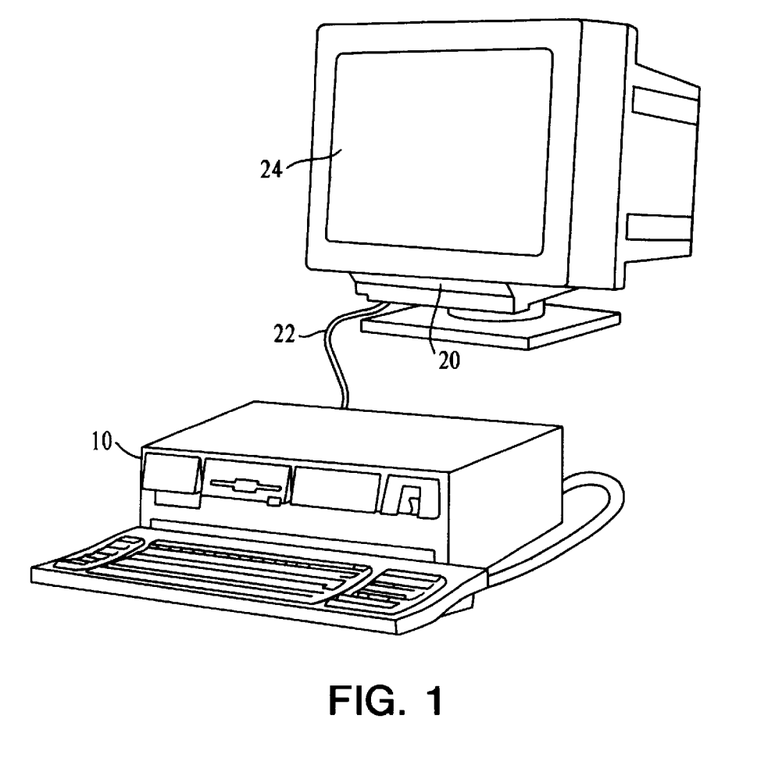
FIG. 1 is an illustration of a computer system coupled to a display monitor via a monitor interface cable.

Referring to FIG. 1, an illustrative embodiment of a computer system 10 and a display monitor 20 coupled together through a monitor interface cable 22 is shown. The computer system 10 generates and transmits display data through the monitor interface cable 22 in order to produce images on a display area 24 of the display monitor 20. Additionally, the computer system 10 generates and transmits command data transmitted through monitor interface cable 22 and intercepted by a microcontroller (not shown) located inside the display monitor 20. The command data causes the microcontroller to alter various parameters of the display monitor 20, including brightness and screen configurations, as well as power in turning the display monitor 20 "on" and "off". Additionally, the microcontroller inside the display monitor 20 provides status information which is transmitted through the monitor interface cable 22 back to computer system 10 in response to certain commands from the computer system 10.

Figure 2:
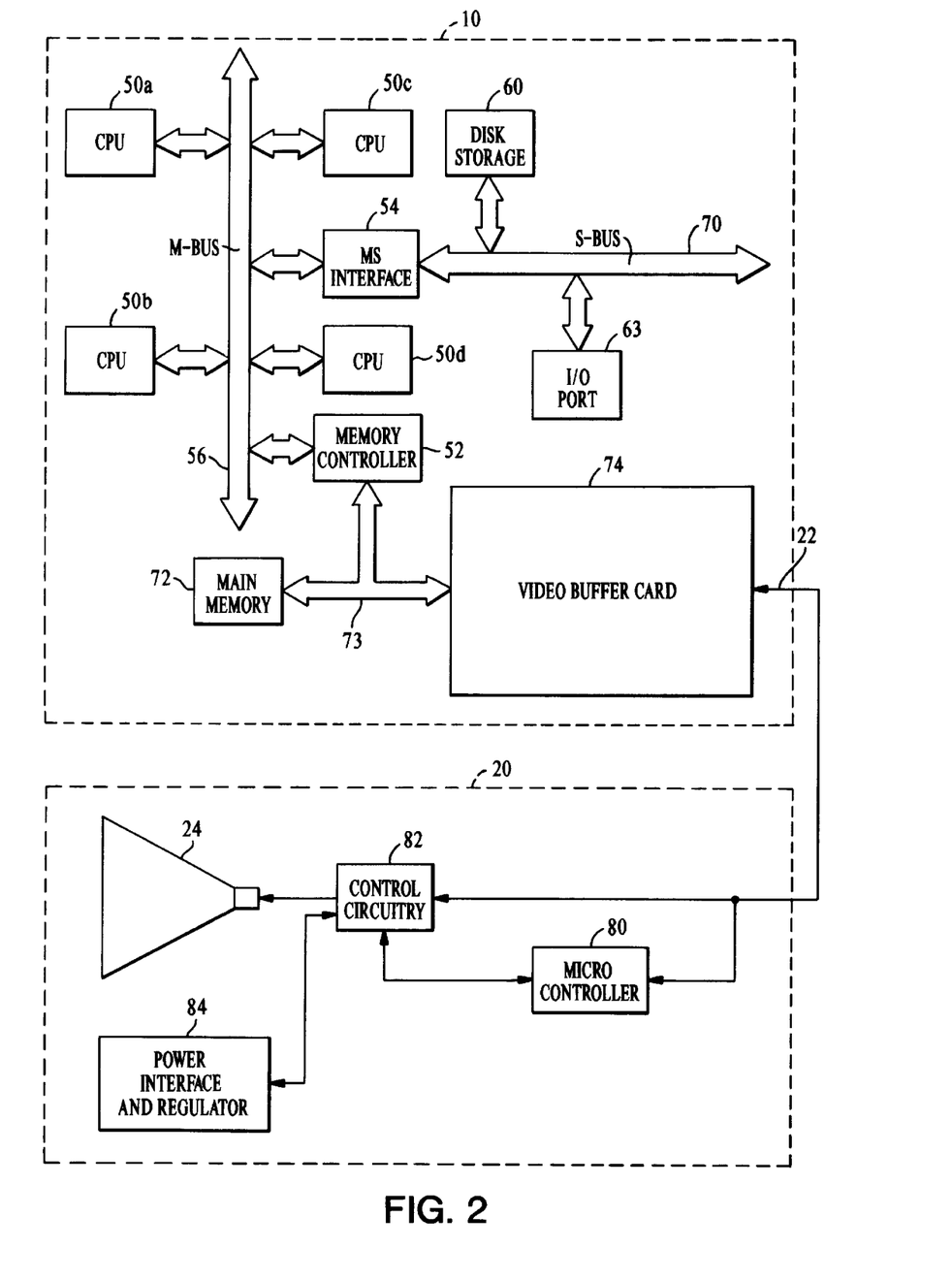
FIG. 2 is a block diagram illustrating an embodiment of the internal circuitry of the computer system and display monitor coupled together by the monitor interface cable.

Referring now to FIG. 2, an illustrative embodiment of the various circuits and systems that comprise the computer system 10 and display monitor 20 of FIG. 1 are shown. The computer system 10 comprises at least one (preferably multiple) central processor units ("CPU") 50a–50d, a memory controller 52 and an M-bus-to-S-bus ("MS") Interface 54, all of which are coupled to a memory bus ("M-bus") 56. A disk storage device 60 and at least one I/O port 63 are coupled to a system bus ("S-bus") 70 which, in turn, is coupled to the MS Interface 54. The memory controller 52 acts as an interface between the M-bus 56 and a bus 73 coupling main memory 72 and video buffer card 74. The monitor interface cable 22 couples the video buffer card 74 to a microcontroller 80 and control circuitry 82 located within the display monitor 20 to establish bi-directional communication between the computer system 10 and the display monitor 20. Within the display monitor 20, the control circuitry 82 controls a display device 24 such as a cathode ray tube ("CRT") and is coupled to a power interface and regulator 84 to receive power therefrom. It is contemplated that the display device may include flat panel displays and any other displays well known in the art. Peripheral devices such as a keyboard or a cursor control device (e.g., mouse, trackball, touchpad) are coupled to the I/O port 63.

During operation, one of the CPUs 50a–50d, for example CPU 50a, loads and executes program instruction sequences of a specific program loaded in main memory 72 or from software loaded in the disk storage device 60 and subsequently placed in main memory 72. The CPU 50a writes data for display purposes ("pre-video display data"), such as cursor control information, into the video buffer card 74 via the memory controller 52. In response to this pre-video display data, the video buffer card 74 transmits both display data and command data over the monitor interface cable 22 to the control circuitry 82 and the microcontroller 80 located inside display monitor 20. The command data enables the microcontroller 80 to configure the control circuitry 82 and power interface and regulator 84 to properly display a video image and to provide status information back to the video buffer card 74 through the monitor interface cable 22. The display data, however, enables the control circuitry 82 to display the video image on the display device 24.

Figure 3:
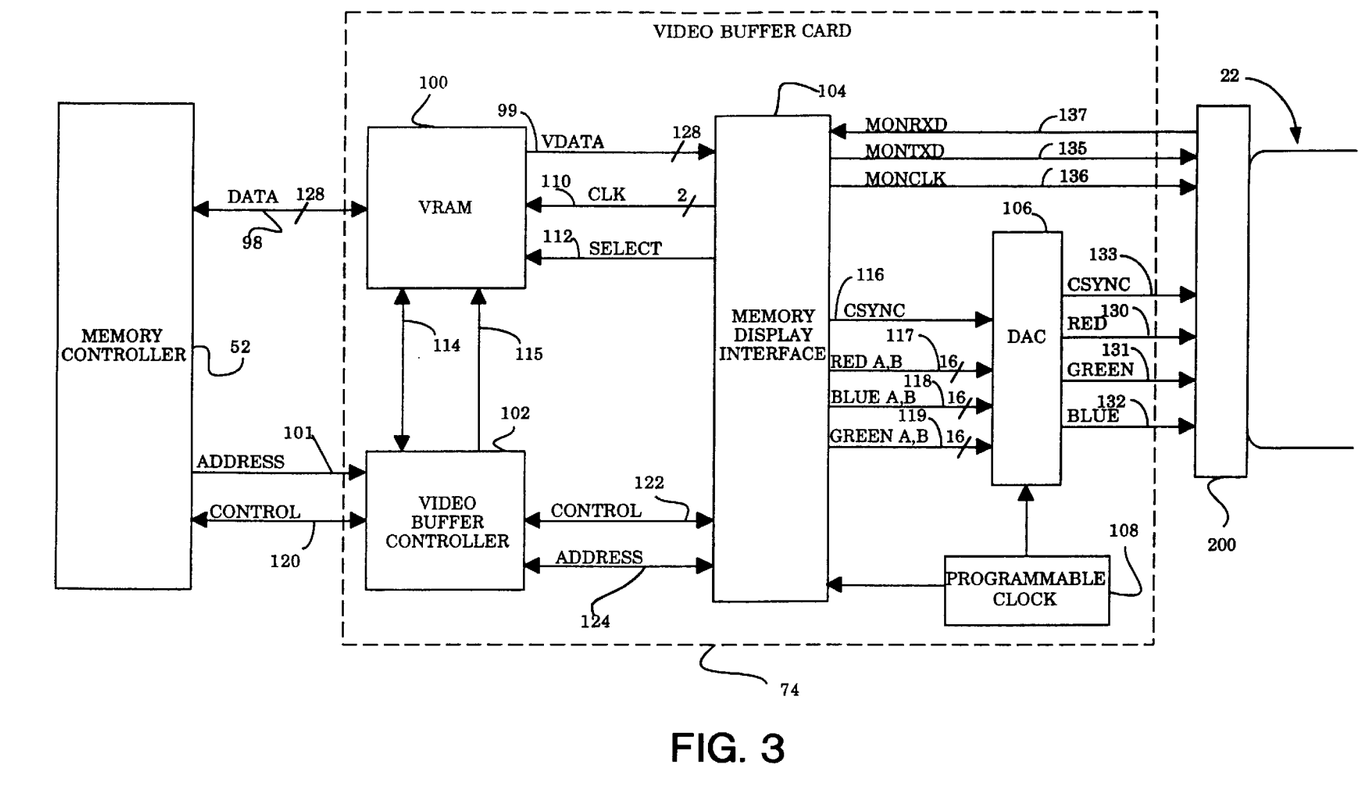
FIG. 3 is a more detailed block diagram of a video frame buffer card of FIG. 2 configured to receive data, control data and address information via the memory controller and to transmit command data and display data through various transmission lines of the monitor interface cable.

Referring now to FIG. 3, an illustrative embodiment of the video buffer card 74 of FIG. 2 coupled between the monitor interface cable 22 and the memory controller 52 is shown. As illustrated in FIG. 3, the video buffer card 74 comprises a video random access memory ("VRAM") 100, a video buffer controller 102, a memory display interface 104, a digital-to-analog converter ("DAC") 106 and a programmable clock 108. The main memory, being controlled by the memory controller 52, provides pre-video display data to the VRAM 100 over a 128-bit wide data bus 98. Configured into two banks or buffers (not shown), the VRAM 100 is coupled to the video buffer controller 102 through video control data lines 114 and video address lines 115 which enable the video buffer controller 102 to perform various control operations on the VRAM 100 including refresh.

The video buffer controller 102 receives address and control information from the memory controller 52 through signal lines 101 and 120, respectively. The video buffer controller 102 uses this address information for addressing main memory (see FIG. 2) and uses this control data for performing control operations to VRAM 100 as discussed above. The video buffer controller 102 further provides control and address information to the memory display interface 104 via control and address lines 122 and 124.

The memory display interface 104 receives video display data ("VDATA") from the VRAM 100 over a bit-wide video data bus 99 (preferably 128-bits in width) and generates a combined horizontal and vertical synchronization ("Csync") signal along bus line 116 and color display data corresponding to red, green and blue ("RGB") values for a particular pixel location via color output lines 117, 118 and 119. The color display data for each color comprises a first set "A" and a second set "B", each set having 8 bits of data for a total of 48 data signals. Thus, each set (A and B) of color data signals comprises a total of 24 bits.

These color display signals are input into a digital-to-analog converter ("DAC") 106, clocked by a programmable clocking circuit 108 of preferably 216 MHz, which generates three sets of voltage levels corresponding to these red, green and blue signals, respectively. Moreover, the DAC 106 delays the Csync signal for providing the display monitor with accurate timing for placement of RGB data on the display screen for viewing. The delayed Csync signal and the RGB data are transmitted through corresponding transmission lines 130–133. These voltage levels and the Csync signal primarily form the display data which is transmitted into a video connector 200 of the monitor interface cable 22 for later input into the display monitor.

Figure 4:
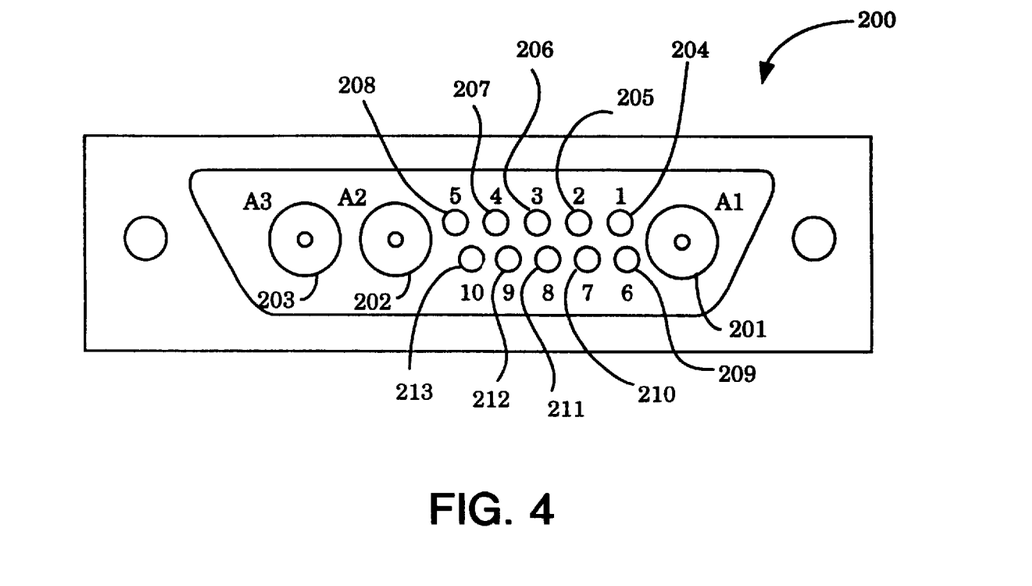
FIG. 4 is a perspective view of a cable connector employed at either end of the monitor interface cable being used to couple the computer system to the display monitor.

Additionally, the memory display interface 104 receives control information from the video buffer controller 102 through control line(s) 122. The memory display interface 104 generates and transmits command data over a monitor transmission ("MONTXD") line 135 and drives a clock signal, having a time period of preferably 50 micro-seconds ("μs"), through a monitor clocking ("MONCLK") line 136. These transmission lines 135 and 136, included in the monitor interface cable 22 as discussed with reference to FIG. 4, provide commands and its corresponding clocking signals to the display monitor 20 in response to the control information.

During operation, the memory display interface 104 transmits a clocking signal and a buffer selection signal to VRAM 100 via a clock ("CLK") and a buffer selection ("SELECT") signal lines 110 and 112. These signals enable video data to be transmitted in a predetermined order from a first of two buffers in VRAM 100 to the memory display interface 104. This video data is used by the memory display interface 104 to generate the first and second sets of display data signals provided to the DAC 106 as discussed herein and in U.S. Patent Application entitled "High Speed Display System Having Cursor Multiplexing Scheme" incorporated herein by reference.

Concurrently, the video buffer controller 102 updates the buffer in VRAM 100 with new processed data written into main memory by one of the CPUs 50a–50d (see FIG. 2) through the memory controller 52. Once a complete frame of data has been transmitted from VRAM 100 and into the memory display interface 104, the buffer selection signal 112 now selects the second buffer of VRAM 100 to be clocked into the memory display interface 104. During this time, the video buffer controller 102 updates the first buffer of VRAM 100 using data provided by one of the CPUs 50a–50d.

As previously alluded to above, the memory display interface 104 receives control information such as cursor control information and command data from the video buffer controller 102 via data lines 122. Based on this control data, the memory display interface 104 generates command data and transmits the command data to the display monitor 20 over the MONTXD line 135. The address propagating over address lines 124 programmability selects those register(s) that drive(s) MONTXD and MONCLK lines 135 and 136 and that read(s) a monitor receive ("MONRXD") line 137. It is further noted that command data, transmitted through the MONRXD line 137 from the display monitor to the computer system, is subsequently transmitted through the data lines 122 through the video buffer controller 102 and into the memory controller 52 for use as status information.

Referring to FIG. 4, a prospective view of the video connector 200 employed at the ends of monitor interface cable 22 pursuant to the illustrative embodiment of FIG. 3 is shown. The video connector 200 is a standard 13W3 cable connector, well known in the industry. Contacts A1, A2 and A3 201–203 are coaxial connectors which carry display data corresponding to red, green and blue voltage levels output from the video buffer card, respectively. A fifth contact 208 provides the Csync signal over a TTL voltage level twisted pair. An eighth and ninth contacts 212 and 213 are serial data output/input connectors coupled to a fourth contact 207 through 100 Ohm resistors. A tenth contact 213 is a return ground pin for the Csync signal of the fifth contact 208. A first contact 204 transmits the clock signal from the MONCLK output of video buffer card for synchronizing the serial data transmissions from a sixth and second contacts 209 and 205. The second contact 205 transmits serial command data from the MONTXD output of video buffer card synchronized with the MONCLK signal to the microcontroller within the display system. The sixth contact 209 is coupled to the MONRXD input to receive serial data synchronized with the MONCLK signal sent from the display monitor 20 as well as provides a vertical Sync signal when the computer system 10 is coupled to older model display monitors. The fourth contact 207 is a ground return for the signals on the MONCLK, MONTXD and MONRXD lines (hereinafter referred to as MONCLK, MONTXD and MONRXD signals) applied to the first, second and sixth contacts 204, 205 and 209. It is contemplated that a third and seventh contacts 206 and 210 may be left unconnected.

Figure 5:
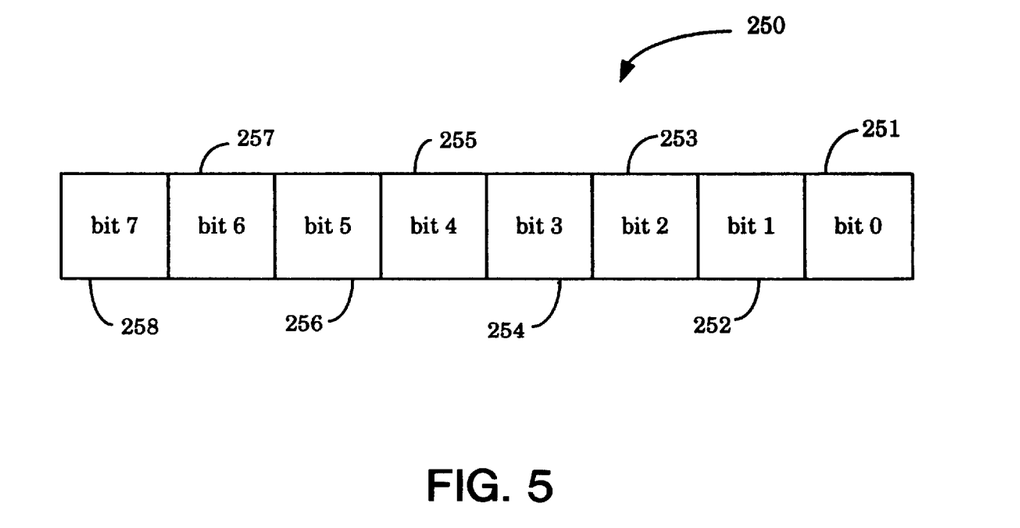
FIG. 5 is a block diagram of the bit representation of the read-write monitor byte.

In order for a software program, which in the preferred embodiment is a Unix™ driver, to send command data through the Video Buffer Card 74, the command data must be written to a particular memory address (e.g. 0X09000) from which it will be delivered to the display monitor. This address is called the monitor read-write address. As illustrated in FIG. 5, a lower byte associated to this memory location (hereinafter "monitor read-write byte") 250 is used to transmit and receive the command data. The memory controller and the video buffer controller cause data written into the monitor read-write byte 250 to be placed in the appropriate location in VRAM such that the monitor display interface will receive the data and transmit it to the display monitor over the monitor interface cable. Additionally, data received from the display monitor is read by one of CPUs from the same address base. If a second card is installed, as is possible in an alternative embodiment of the invention, the address is decoded through the memory controller 50 to support the two cards.

The monitor read-write byte 250 contains the command data, wherein only the four least significant bits (Bit0–Bit3) 251–254 are used while the four most significant bits (Bit7–Bit4) 255–258 are reserved for unrelated applications. The third bit ("Bit3") 254 of the monitor read-write byte 250 is a select bit used internally to indicate whether the display monitor of the system employs a microcontroller. In this configuration, if Bit3 254 is set to "logic 0" indicating that the display monitor has a properly configured microcontroller connectable to the video buffer card, Bit0–Bit2 251–253 of the monitor read-write byte 250 temporarily store and provide the voltage values of the MONRXD, MONTXD, and MONCLK signal. If Bit3 is set to "logic 1", a vertical Sync signal will be driven on the MONTXD line of the video buffer card to achieve compatibility with older type display monitors not configured with the internal microcontroller. This vertical Sync signal will be transmitted through a four step pipeline delay within the memory display interface to match the Csync signal output from the DAC as previously alluded to in reference to FIG. 3.

Each write to monitor read-write byte 250 will cause at most one bit of data to be written from the MONTXD line to the display monitor. Thus, it will require at least 16 writes to the monitor read-write address to transfer one byte of command data because two bits of clocked data are required to generate the logic "0" to logic "1" clock transition necessary to clock in one bit of command data. A byte word is transmitted least significant bit first. For example, in order to write a command byte represented by a hexadecimal bit representation "71H" to the display monitor, the proper sequence would be performed as shown in Table 1.

TABLE 1

| bit 7 | bit 6 | bit 5 | bit 4 | bit 3 | RXD bit 2 | TXD bit 1 | CLK bit 0 | READ-WRITE BYTE (in HEX) | |
|---|---|---|---|---|---|---|---|---|---|
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 0 | 0 | 00 | } 0 |
| 0 | 0 | 0 | 0 | 0 | 0 | 0 | 1 | 00 | |
| 0 | 0 | 0 | 0 | 0 | 0 | 0 | 0 | 00 | } 0 |
| 0 | 0 | 0 | 0 | 0 | 0 | 0 | 1 | 01 | |
| 0 | 0 | 0 | 0 | 0 | 0 | 0 | 0 | 00 | } 0 |
| 0 | 0 | 0 | 0 | 0 | 0 | 0 | 1 | 01 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 0 | 0 | 00 | } 0 |
| 0 | 0 | 0 | 0 | 0 | 0 | 0 | 1 | 01 | |

In this sequence, each "low" to "high" transition in Bit0 of the monitor read-write byte) indicates detection of a positive edge of the MONCLK signal and thus causes the value on Bit1 to be detected by the microcontroller employed in the display monitor. Therefore, the writing of a byte "02H" follow by a writing of a byte "03H" represents the clocking in of a logic level "1" from the computer system to the display monitor and writing of a byte "00H" follow by the writing of a byte "01H" represents the clocking in of a logic level "0". More than 16 writes, however, may be required in some embodiments of the invention if a slower clock speed is required for proper operation. The above example serves to only show the minimum number of writes required.

Figure 6:
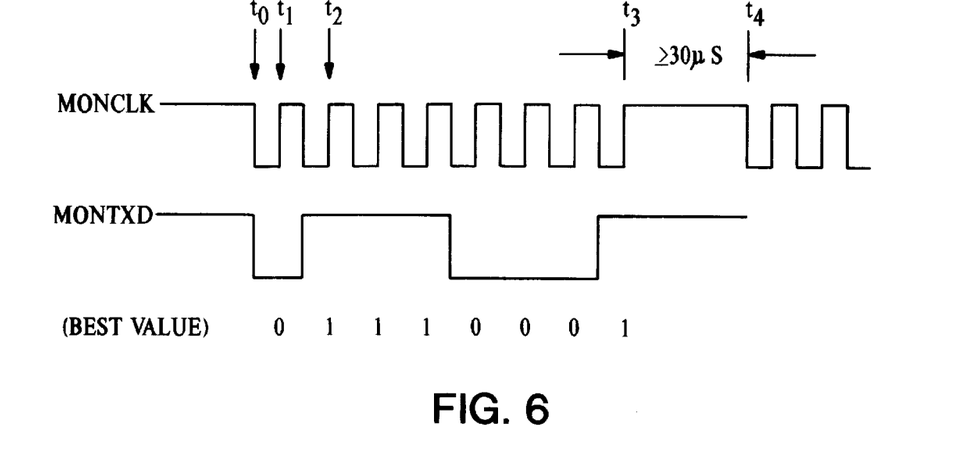
FIG. 6 is a timing diagram illustrating the signals used to transfer one byte of command data from the computer system to the display monitor.

FIG. 6 is a timing diagram illustrating the signal transitions associated with transfer of a single data byte from the computer system to the display monitor as shown in FIG. 5. The transmission of a single byte of data begins at time "$t_0$" with a negative edge on the MONCLK signal which results from a logic level "0" being written into Bit0 of the monitor read-write byte. At this same time, the MONTXD signal goes "low" as a result of a logic level "0" also being written into Bit1 of the monitor read-write byte. At time "$t_1$", the MONCLK signal goes "high" as a result of a logic level "1" being written to Bit0 of the monitor read-write byte (i.e., a positive edge of the MONCLK) which causes the logic level "0" on the MONTXD line to be clocked in as the first bit of the data byte. However, at time "$t_2$", a logic level "1" is written into the second bit of the data byte. At time "$t_3$", after eight bits have been clocked into the data byte, the MONCLK signal is held logic "high" for at least 30 µs. This is necessary for the display monitor to be able to process the data byte. The transmission of the next byte starts at time $t_4$. During operation, MONRXD and MONTXD signals are normally logic "high" when idle. Transmit and receive operations are completely independent, allowing for full duplex communication. Set up and hold times are 100 nanoseconds, exclusive of cable propagation delays.

Although it may appear that the interface described is closely related to the inter-integrated circuit serial bus ($I^2C$), the protocol disclosed for the present invention however, is a simplified version of this serial bus that reduces cost of implementation by taking advantage of the fact that an exclusive master slave relationship is required to achieve the goals of computer system control of the display monitor. Each byte of data are split into 2 nibbles being 4-bits each; namely, a most significant nibble and a least significant nibble. Thus, all monitor internal register values are internally scaled to reside between the hexadecimal ranges of "00H" and "FFH".

In the protocol used in the described embodiment of the invention, a command or instruction comprises a number of bytes of data consecutively sent to the display monitor as described above. These data bytes may include, but are not limited to (i) a packet header, (ii) a message header, (iii) a category code, (iv) a command category, (v) a command code and (vi) a terminator. As indicated above, the command begins with the transmission of a first byte representing the packet header. The packet header indicates the propagation path of communication information. For example, the packet header may store a unique hexadecimal value designating a computer system-to-display monitor communications path or another unique hexadecimal value designating a display monitor-to-computer system reply.

The next byte transmitted is the message header which indicates the type of information transmitted through the monitor interface cable. It is contemplated that various information types may include, but are not limited to command, inquiry, acknowledgment and error. The third byte of the command is the category code which specifies the type of device to which the command is being transmitted. For example, a display monitor may be defined by a unique hexadecimal bit representation while other unique bit representations may be associated with other devices.

The fourth byte is the command category which defines the broad category of commands under which the specific instructions fall. Examples include user controls, decrement, switch control codes, etc. The fifth byte is a command code which specifies the particular instruction which is to be executed in order to perform a given command such as, for example, a common geometric adjustment. It is contemplated that additional bytes may be included in combination with the command code; namely, (i) subcodes that offer finer division of command codes such as pin cushion adjustment, contrast change, etc. or (ii) additional data bytes depending on the particular type of command. Finally, the command is terminated by the terminator being a unique hexadecimal bit representation.

Figure 7:
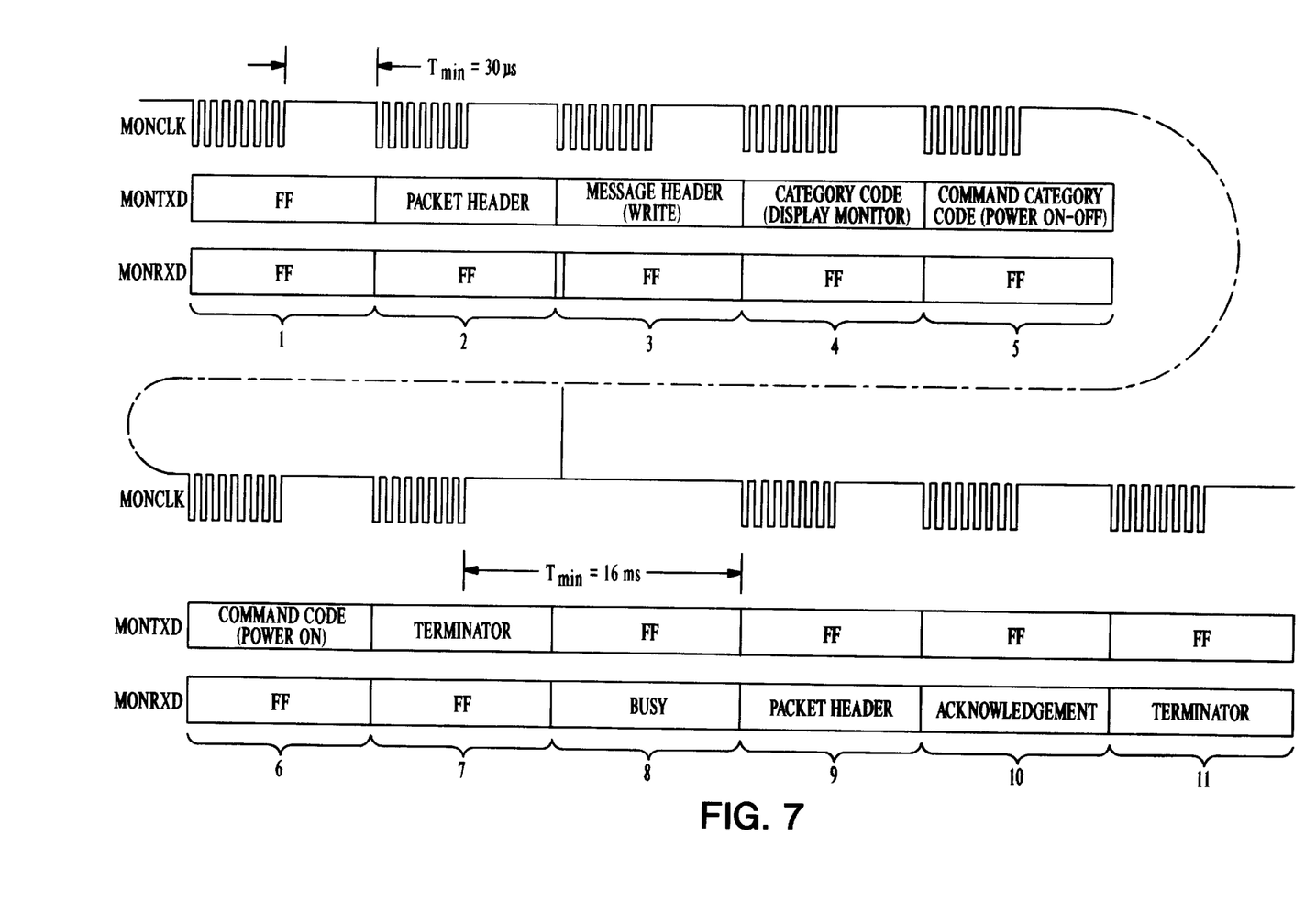
FIG. 7 is a timing diagram illustrating the timing associated with the transmission of a set of command bytes associated with a single command from the computer system to the display monitor.

As previously indicated above, the following are two examples of command interaction between a display monitor and computer system coupled through the monitor display cable. Referring to FIG. 7, a timing diagram is shown illustrating the bytes forming a command being transmitted from the computer system to the display monitor such as, for example, a power-on command. It is contemplated that each type of command is represented by a unique hexadecimal number as well as the bytes forming the command. During byte 1, when no information is being transmitted, both the display monitor and the computer system apply a logic level "1" to the MONTXD and MONRXD lines respectively, which in turn causes a "FFH" to be read. The display monitor will return "FFH" while idle and any selected hexadecimal representation if the display monitor is not ready (i.e., Busy) to return data after a command has been received.

The command begins with the transmission of the packet header at byte 2 from the computer system indicating that a command being transmitted from the computer system to the display monitor. At byte 3, the computer system transmits the message header indicating, for example, that a write command will be initiated typically in order to modify an internal state of the display monitor. At byte 4, the computer system transmits the category code indicating that the command is being transmitted to the display monitor. At byte 5, computer system transmits the command category which indicates that the command is a power on-off command as selected. At byte 6, the command code is transmitting indicating the selected instruction such as a power turn-on. At byte 7, the terminator being represented, for example as a "FFH", is transmitted indicating the termination of the command.

After the command has been issued, the display monitor requires a predetermined time to respond which in this embodiment is 16 milliseconds. During this time, no MON-CLK signal should be provided and display monitor transmits a hexadecimal value indicating it is busy as shown in byte 8. Thereafter, the display monitor may transmit a command acknowledging receipt of the power turn-on command through (i) a packet header, (ii) a message header as an acknowledgment and (iii) a terminator. As shown in FIG. 7, at byte 9, the display monitor transmits the packet header indicating the start of the command from the display monitor to the computer system. At byte 10, the display monitor transmits the acknowledgment indicting that the command data from the computer system has been received and performed successfully. At byte 11, the display device transmits a "FFH" indicating the end of the acknowledgment.

Figure 8:
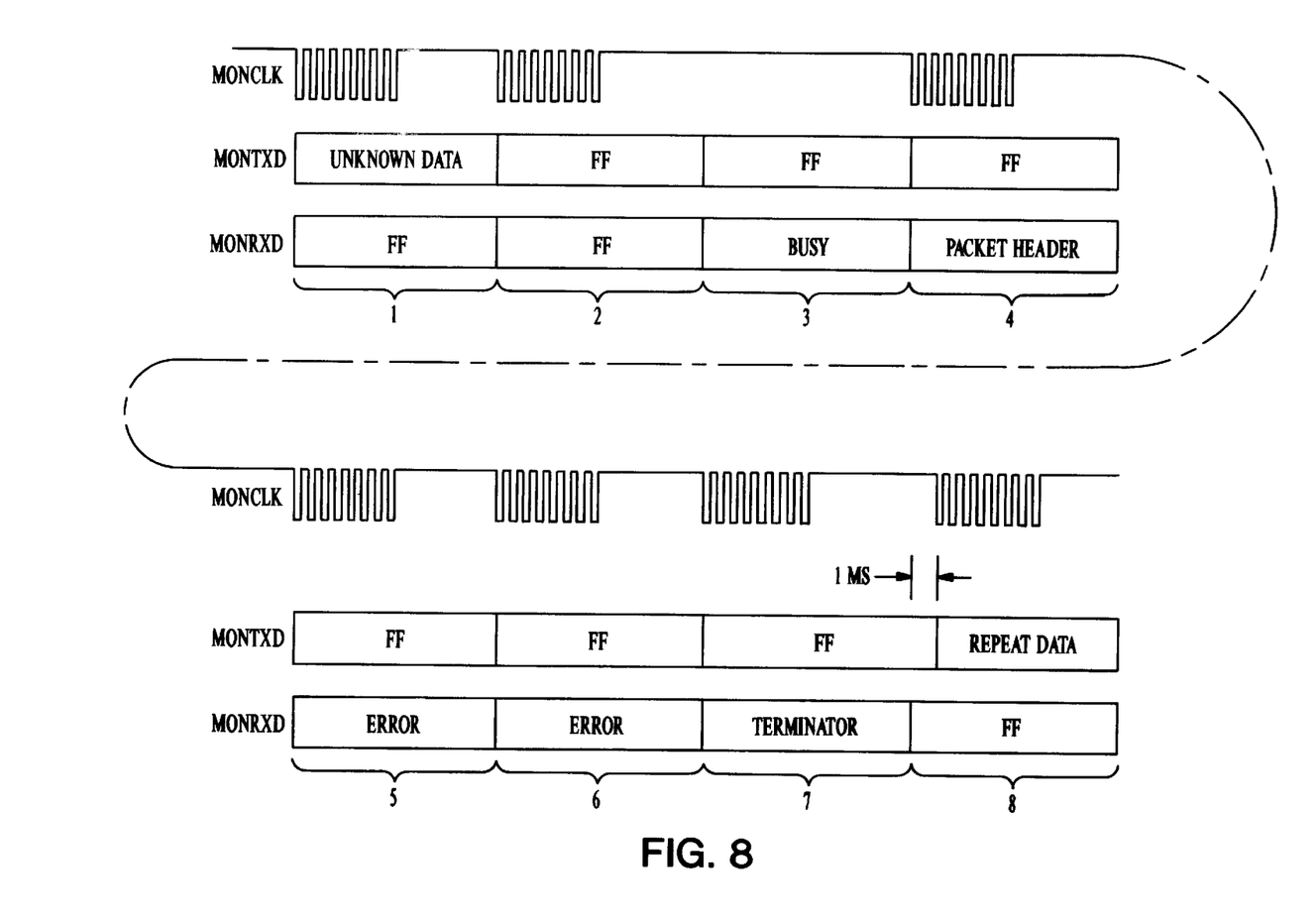
FIG. 8 is a timing diagram illustrating the timing associated with the transmission of a faulty command from the computer system to the display monitor.

Referring now to FIG. 8, a timing diagram illustrating the bytes associated with a failed transaction is shown. At byte 1, unknown data is transmitted from computer system to display monitor. At byte 4, the display monitor responds with a packet header to indicate commencement of a display monitor reply. Thereafter, at bytes 5–6, the display monitor transmits a message header indicating an error and a command code indicating a particular error instruction via MONRXD lines thereby indicating that the previous transfer was not a valid transaction for that display monitor. During byte 7, the display monitor transfers the terminator "FFH" wherein, after waiting at least one millisecond to allow the display monitor to clear its error flag and re-initialize the serial interface, the computer system can begin re-transmission of the data.

Thus, a method and apparatus for transmitting and receiving both command and display information between computer system and display monitor using a single cable has been described. To one skilled in the art, alternative embodiments of the invention will be apparent. The example provided is merely for illustrative purposes and should not be taken as limiting the scope of the invention.

What is claimed is:

1. A system for serially transmitting display data and command data, the system comprising:
    a computer system configured to generate and transmit the display data and the command data;
    a display monitor configured to receive the display data that produces an image associated therewith, to receive the command data for adjusting characteristics of said display monitor and to return status information to said computer system in response to the command data; and
    a monitor interface cable coupled to said computer system and said display monitor, said monitor interface cable being configured to enable transmission of the display data and the command data between said computer system and said display monitor and including
        a monitor transmission line which enables the command data to be transmitted from said computer system to said display monitor,
        a monitor receive line which enables the status information to be transmitted from said display monitor to said computer system, and
        a monitor clocking line which provides a master clocking signal to synchronize serial transmissions of at least the command data.

2. The system as set forth in claim 1, wherein said computer system concurrently transmits the display data and the command data to said display monitor.

3. The system as set forth in claim 2, wherein said display monitor includes:
    a display surface;
    control circuitry configured to receive and display said display data on said display surface; and
    a microcontroller configured to receive the command data in a serial format, determine a particular instruction associated with the command data, program said control circuitry to properly display the image in accordance with the command data and provide said status information to said computer system in response to the command data.

4. The system as set forth in claim 2, wherein said monitor interface cable serially transmits the command data.

5. The system as set forth in claim 1, wherein said monitor clocking signal of said monitor interface cable operates as a vertical synchronization signal.

6. The system as set forth in claim 1, wherein said monitor interface cable is terminated with a first connector and a second connector, each of said first and second connectors including at least three coaxial contacts and at least three line contacts correspondingly coupled to said monitor transmission line, said monitor clocking line and said monitor receive line, respectively.

7. The system as set forth in claim 6, wherein said system further includes a storage element which contains a monitor read-write byte to provide temporary storage of the command data prior to the command data being serially transmitted through said plurality of transmission lines, wherein
    a logic value of a first bit of said storage element is output through said monitor clocking line of said monitor interface cable and into said display monitor, and
    a logic value of a second bit in said storage element is output through said monitor transmission line of said monitor interface cable and into said display monitor.

8. The system as set forth in claim 7, wherein said storage element further includes a bit to indicate whether said display monitor includes a microcontroller.

9. The system as set forth in claim 1, wherein said display data comprises:
    a combined synchronization signal having vertical and horizontal synchronization data;
    a first signal which provides intensity data for a first color synchronized with said combined synchronization signal;
    a second signal which provides intensity data for a second color synchronized with said combined synchronization signal; and
    a third signal which provides intensity data for a third color synchronized with said combined synchronization signal.

10. The system as set forth in claim 1, wherein the command data comprises:

a first byte that indicates a propagation path of the command data, said propagation path being in a direction either (i) from said computer system to said display monitor or (ii) from said display monitor to said computer system;

a second byte that indicates a type of the command data, said type being one of a command, an acknowledgment or an error; and a third byte that indicates termination of the command data.

11. A method for transmitting display data and command data through a single monitor interface cable, the method comprising:

receiving display data and command data through a monitor interface cable by a display monitor, the command data including a clock signal to synchronize transmission and reception of the command data through the monitor interface cable;

altering characteristics of the display monitor, based on said command data, in order to alter a display of an image based on said display data; and transmitting status information through the monitor interface cable in response to said command data.

12. The method as set forth in claim 11, wherein said altering characteristics of the display monitor further comprises decoding said command data.

13. A system for transmitting display data and command data comprising:

a computer system which generates and transmits the display data and the command data;

a monitor interface cable having a first end and a second end which is coupled to said computer system, said monitor cable enables the display data and the command data to be transmitted to a display monitor and includes a plurality of display data lines, a monitor transmission line allowing the command data to be transmitted from said computer system to said display monitor, a monitor receive line allowing status information to be transmitted from the display monitor to the computer system, and a monitor clocking line allowing a clocking signal to synchronize transmission of at least the command data; and said display monitor coupled to said first end of said monitor interface cable, said display monitor includes control circuitry which assists in displaying an image based on the display data and a processing element which controls the control circuitry to alter at least brightness of the display monitor based on the command data.

14. The system as set forth in claim 13, wherein said computer system concurrently transmits the display data and the command data to said display monitor.

15. The system according to claim 13, wherein said processing element further controls the control circuitry to alter any characteristic of the display monitor including its power state.

16. The system according to claim 13, wherein said command data includes at least a command category to ascertain a general type of said command data and a command code to provide a particular instruction associated with said command data.

17. The system according to claim 16, wherein said command data further includes at least a category code to specify the type of display device.

18. The system as set forth in claim 13, said monitor interface cable enables status information to be routed from the display monitor to said computer system.

* * * * *